Figure 4:
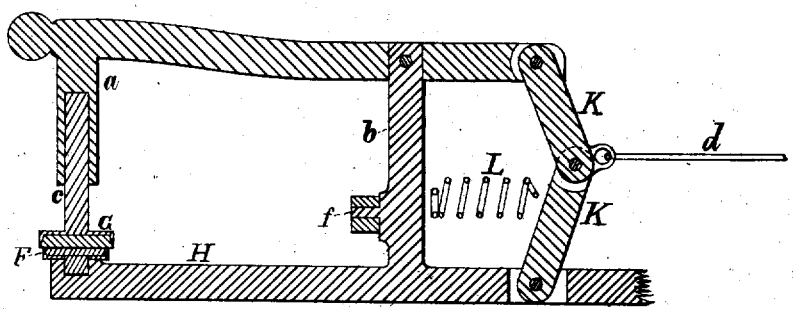

3 Sheets--Sheet 1.

J. M. THOMPSON & G. P. FRENCH.

Heel Grinding and Polishing Machines.

No. 6,103. Reissued Oct. 27, 1874.

Witnesses,
N. G. Lombard
Wm. G. Hibbard

Scott T. Tripp

3 Sheets--Sheet 2.

J. M. THOMPSON & G. P. FRENCH.

Heel Grinding and Polishing Machines.

No. 6,103. Reissued Oct. 27, 1874.

Witnesses
N. C. Lombard
Wm. C. Hibbard

Seth D. Tripp

3 Sheets--Sheet 3.

J. M. THOMPSON & G. P. FRENCH.

Heel Grinding and Polishing Machines.

No. 6,103. Reissued Oct. 27, 1874.

Witnesses,
N. G. Lombard
Wm. E. Hibbard

Scott D. Tripp

BEST AVAILABLE COPY

UNITED STATES PATENT OFFICE.

JAMES M. THOMPSON AND GEORGE P. FRENCH, OF STONEHAM, ASSIGNORS TO SETH D. TRIPP, OF LYNN, MASSACHUSETTS.

IMPROVEMENT IN HEEL GRINDING AND POLISHING MACHINES.

Specification forming part of Letters Patent No. 42,629, dated May 3, 1864; reissue No. 6,103, dated October 27, 1874; application filed July 24, 1874

*To all whom it may concern:*

Be it known that JAMES M. THOMPSON and GEORGE P. FRENCH, both of Stoneham, in the county of Middlesex and State of Massachusetts, invented a new and useful Improved Machine for Polishing or Grinding the Edges of the Heels of either Boots or Shoes; which invention, and all right, title, and interest therein, has been duly assigned to me, SETH D. TRIPP, of Lynn, county of Essex, and State aforesaid, of which the following is a specification:

This invention or improvement has reference particularly to mechanism by which the boot or shoe is held, and its heel is applied to a rotating, grinding, or polishing wheel, to finish the edge of the same. In the machines which were previously constructed for grinding or polishing the edges of heels after they were attached to the boot or shoe, the boot or shoe was placed upon and held by its last, and the heel was supported only by its attachment to the sole. But by this improved mechanism for holding the shoe the heel is held directly between clamps or jaws, one of which bears against the outside or tread of the heel, and the other against the inside of the shoe opposite to the other, by which the heel is compressed and held firmly between the two clamps, while the edges are left free to be presented to the action of the grinding or polishing device, and the use of the last to hold the boot or shoe is dispensed with, which is a matter of great convenience and economy.

This invention, therefore, relates mainly to the construction of the clamps or "jack," by which the boot or shoe is held and supported while the heel is being ground or polished; and consists of a pair of clamping surfaces or jaws, one of which bears against the face of the heel and is somewhat smaller than the same, and the other of which is so mounted as to extend into the boot or shoe and bear upon the inside of the same opposite to the heel, the supports or holders of said jaws being so formed and arranged as to have a free space between them to receive the boot or shoe, and one or both of them are made movable toward and from the other by means of suitable devices, to permit the boot or shoe to be put in and taken out of the same, the whole being mounted upon a pivot or joint at the bottom nearly beneath the jaws, by which the jack, with the shoe confined in it, can be swung laterally and turned a limited distance, to enable the grinding or polishing device to act properly upon the edge of the heel; and it also consists in connecting the two clamps or jaws of the jack with their supports or holders, by means of swiveling-joints, by which means the jaws, with the heel held between them, can be rotated in a vertical plane, so as to present the several sides of the heel to the polishing or grinding wheel in a fixed position.

Figure 1:
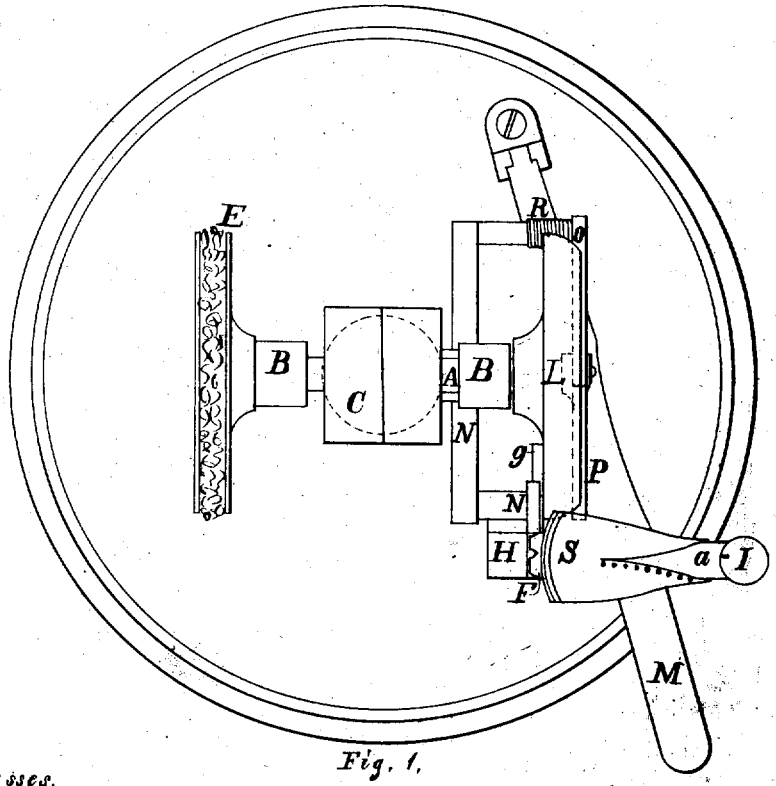
Figure 2:
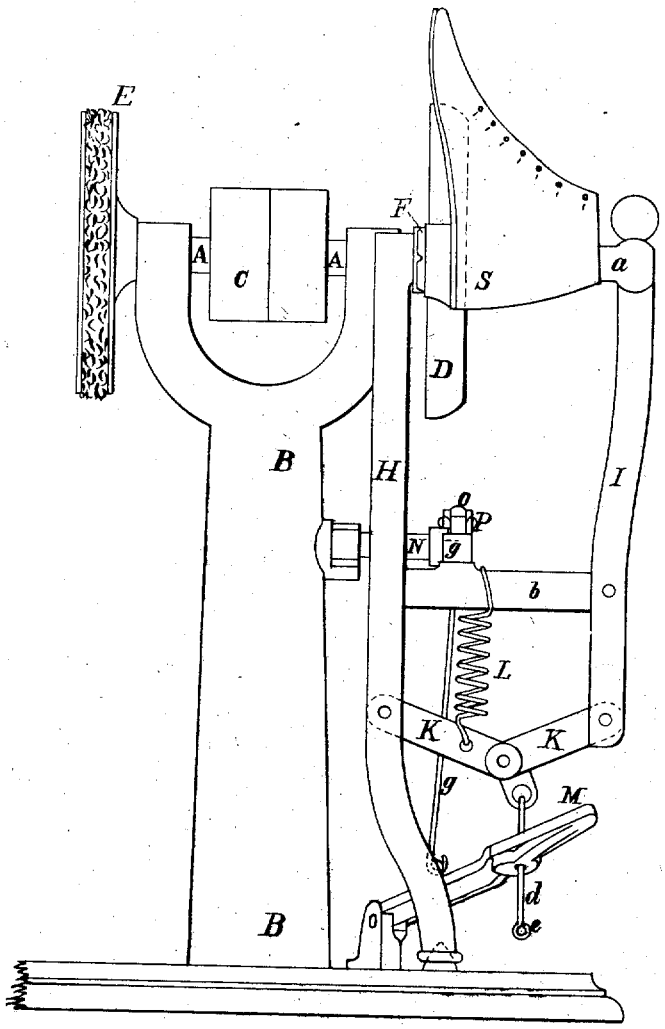
Figure 3:
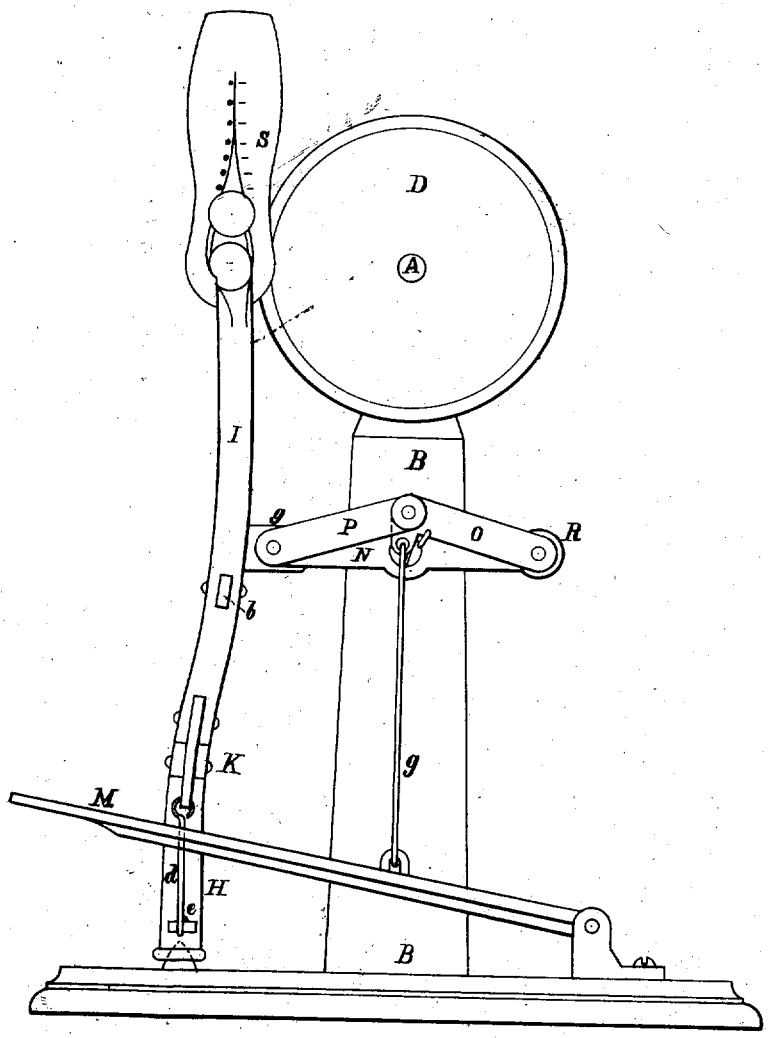

In the drawings, Figure 1 is a top view of the machine. Fig. 2 is a front elevation. Fig. 3 is a side elevation; and Fig. 4 is a vertical section of the upper part of the jack.

In the drawings, A denotes a horizontal shaft, suitably supported by a standard, B, and provided with a driving-pulley, C, a polishing or grinding-wheel, D, and a cleaning or buffing-wheel, E. The wheel D has its grinding or polishing edge formed as seen in Figs. 1, 2, and 3, in order that it may act in the concavity of the periphery of a heel, which while being ground or polished is held between and by two rotary clamps, F G, which are supported by and so as to be capable of freely rotating in the two arms or holders, H I, of the jack, which is formed as shown in Fig. 2. The longer of these holders—viz., H—is pivoted at the bottom within the base of the standard B, upon which the jack is supported, so as to be capable of being turned horizontally thereon, and also of being moved at the top in a direction more or less toward or away from the wheel D. The other holder I is a lever, provided with an arm or projection, *a*, which projects inward toward the other holder, as shown, and is hinged to an arm, *b*, extending from the holder H. One of the clamps—viz., that marked G—has its journal *c* supported by the arm *a*, as shown in Fig. 4, which is a vertical section of the upper part of the jack, with the two clamps and their holders. By this construction of the jack there is provided a sufficient free space between the two arms or holders H and I, to receive the boot or shoe between them, as shown, without distorting it, while the clamp or jaw G, upon the end of the arm *a*, is pressed upon the inner sole, to confine the heel between it and the other clamp. The two holders are connected by toggles K K, arranged at the lower end of the holder I, and are provided with a lifting-spring, L, which depends from the arm *b*, and is hooked into one of the said toggles, as shown, by which arrangement the clamps are forced together, to hold the boot or shoe in an obvious manner. The other of the toggles has a rod, *d*, suspended from it, which extends through a foot-treadle, M, and is provided at its lower end with a cross bar or head, *e*, against which the treadle is to be borne while being pressed downward. By means of the treadle and the said toggles the holder I may be moved in one direction on its fulcrum, so as to move its clamp G away from the clamp F. The spring L operates to close the clamps upon a heel, when placed between them, as shown at S, in Figs. 2 and 4. The arm *b* of the longer holder H, has a journal, *f*, projecting upward from it and entering a bearing formed in a slider, *g*, which is supported by and is capable of sliding horizontally within a frame, N, projecting from the standard B, and carrying another set of toggles, O P, one of which is jointed to the said frame, while the other is jointed to the slider *g*. To these latter toggles and their supporting-frame a spring, R, is applied, for lifting the toggles at their junction, which causes the heel of the shoe held by the clamps to be borne against the periphery of the grinding or polishing wheel D with a yielding pressure, to enable it to conform to the varying shape of the heel. These toggles are connected with the treadle M, by means of a rod, *g'*.

When the treadle is forced downward by the attendant, the set of toggles O P will be put in operation, so as to cause the jack to be borne away from the wheel D. By still farther forcing downward the treadle, the other set of toggles will be moved, so as to cause one of the clamps to move away from the other, in order to enable the shoe to be removed from the clamps and and another substituted in its place.

During the process of grinding or polishing a heel, the attendant can not only turn the heel around in a vertical plane, but by means of the holders he can move it more or less horizontally, so as to cause the grinding-wheel to hollow the edge of the heel, or enter and grind or polish on the concavity thereof, as circumstances may require.

After the shoe has been removed from the clamps, its heel may be subjected to the action of the buffing or cleaning wheel E, which is for the purpose of removing from the heel any loose matters thereon, produced either while grinding or polishing it, such wheel E having its periphery covered with cloth, or being provided with a brush or bristles, or other proper equivalent.

What I claim is—

1. The jack for holding the heel of the boot or shoe, as described, consisting of a pair of clamps or jaws, one of which bears upon the face of the heel, and the other upon the inside of the sole, as described, the holders or arms of said jack being so formed as to leave a free space between them to receive the boot or shoe while so held, and provided with suitable means for opening and closing said jaws, to confine and release the boot or shoe, the whole being mounted upon a pivot or joint at the bottom, nearly beneath the jaws, by which the jack can be swung and turned, to enable the edge of the heel to be properly presented to the grinding or polishing instrument, substantially as described.

2. The combination, with the jack, of the rotating or swiveling jaws or clamps, by which the boot or shoe, while it is held between said jaws in the jack, can be turned so as to present the edge of the heel on all sides to the grinding or polishing instrument, substantially as described.

3. The combination of the said jack, mounted upon a pivot or jointed at the bottom, and the grinding or polishing instrument, and suitable means of applying a yielding pressure to the jack, whereby the grinding or polishing instrument can be applied with the requisite continuous pressure to the varying form of the heel while held in the jack, substantially as described.

4. The arrangement of the cleaning-wheel E, with the grinding or polishing wheel D, and the mechanism, as described, for holding, operating, and guiding the boot or shoe whose heel is to be ground or polished, substantially as described.

Executed July 9, 1874.

SETH D. TRIPP.

Witnesses:
N. C. LOMBARD,
WM. C. HIBBARD.